United States Patent [19]

Lehmann et al.

[11] 4,122,128
[45] Oct. 24, 1978

[54] STORABLE RAPIDLY HARDENING EPOXY RESIN ADHESIVE

[75] Inventors: Hans Lehmann, Aesch; Helmut Zondler, Bottmingen, both of Switzerland

[73] Assignee: Ciba-Geigy Corporation, Ardsley, N.Y.

[21] Appl. No.: 864,284

[22] Filed: Dec. 27, 1977

[30] Foreign Application Priority Data

Jan. 7, 1977 [CH] Switzerland .......................... 173/77

[51] Int. Cl.$^2$ .......................................... C08L 63/00
[52] U.S. Cl. ................................................ 260/837 R
[58] Field of Search .......................... 260/837 R, 836

[56] References Cited

U.S. PATENT DOCUMENTS

| | | | |
|---|---|---|---|
| 3,201,374 | 8/1965 | Simms | 260/837 R |
| 3,519,576 | 7/1970 | Johnsonm | 260/2 |
| 3,520,905 | 7/1970 | Johnson | 260/345.2 |
| 3,860,541 | 1/1975 | Lehmann et al. | 260/18 PN |

*Primary Examiner*—Paul Lieberman

*Attorney, Agent, or Firm*—Vincent J. Cavalieri; Joseph F. DiPrima

[57] ABSTRACT

A storable, rapidly hardening epoxy resin adhesive consisting of
  a. a polyglycidyl compound having a softening temperature between 40° and 90° C,
  b. a 2,5-di-(ω-aminoalkyl-1')-pyrazine of the formula

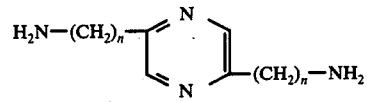

wherein $n$ is an integer from 3 to 6, and
  c. a copolymer of ethylene, acrylic acid and acrylate having a melting range from 70° to 110° C, said epoxy resin adhesive contains, per 1 equivalent of glycidyl groups, 0.5 to 1.5 equivalents of hydrogen atoms bonded to nitrogen of the 2,5-di(ω-aminoalkyl-1')-pyrazine and, per 100 parts by weight of the polyglycidyl compound, contains 3 to 20 parts by weight of the copolymer of ethylene, acrylic acid and acrylate.

6 Claims, No Drawings

STORABLE RAPIDLY HARDENING EPOXY RESIN ADHESIVE

The invention relates to storable epoxy resin compositions which harden sufficiently rapidly at temperatures between 80° and 100° C. and which are used in particular as adhesives.

A large number of different single component epoxy resins suitable for bonds and having a good shelf life are already known. An old known system consists for example of the actual epoxy resin based on bisphenol A or another polyphenol and dicyandiamide as hardener. This single component resin, which is chiefly used as a powder, has however the disadvantage that it can only be cured at temperatures above 100° C. The incorporation of aromatic or cycloaliphatic amines in solution or in the melt instead of dicyandiamide into the above epoxy resins results in single component epoxy resins which do have the advantage of more rapid curing even at lower temperatures, but which at the same time have an unsatisfactory shelf life.

Very useful, storable epoxy resin adhesives are the systems claimed in U.S. Pat. No. 3,860,541, which contain as basic constituents a cyclic polyglycidyl compound with a softening temperature between 40° and 140° C., a free amino group containing adduct of an epoxy resin and an aromatic or cycloaliphatic amine and triethylenetetramine or a polyaminoamide of dimerised fatty acids.

Using such adhesives, it is possible to obtain good adhesive values by curing for 10 minutes at 120° C. The tensile shear strength according to DIN 53 282 is about 20 N/mm$^2$ and the peel strength according to British Standard DTD 5577 is about 4 N/mm. However, if even lower temperatures are used during the curing, for example 80° C., then longer times of about 60 minutes are necessary to produce a still useful bond. The tensile shear strength is then only 5 N/mm$^2$.

In Table III of U.S. Pat. Nos. 3,519,576 and 3,520,905, liquid epoxy resin mixtures are mentioned which contain as hardeners crystalline polyamine salts of polyhydric phenols (for example ethylenediamine bisphenol A). It goes without saying that such liquid resin systems are virtually non-storable, and they have a reported shelf life of 1 day. All other epoxy resin systems mentioned in both these U.S. patent specifications either have the disadvantage that they also have an inadequate shelf life or that a curing at temperatures between 90° and 100° C. cannot be carried out in a sufficiently short time or does not result in a sufficiently good adhesion.

It is the task of the invention to provide epoxy resin adhesives with an adequate shelf life which, using still shorter curing times at temperatures between 80° and 100° C., produce even stronger bonds than can the epoxy resin mixtures of the described prior art at curing temperatures of up to 100° C. The solution of this technical problem is of great importance especially in those fields in which plastics having relatively low softening ranges, such as ABS polymers, polyethylene and PVC, are to be bonded in as large a quantity as possible. The ski manufacturing industry may be mentioned here as a particular example.

Accordingly, the invention provides a storable, rapidly hardening epoxy resin adhesive which contains
a. a polyglycidyl compound containing an average more than one glycidyl group in the molecule and having a softening temperature between 40° and 90° C.,
b. a 2,5-di-(ω-aminoalkyl-1')-pyrazine of the general formula I

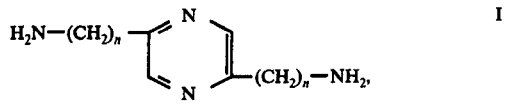

wherein n is an integer from 3 to 6, and
c. a copolymer of ethylene, acrylic acid and acrylate having a melting range from 70° to 100° C.,
such that said epoxy resin adhesive contains, per 1 equivalent of glycidyl groups, 0.5 to 1.5 equivalents of hydrogen atoms bonded to nitrogen of the 2,5-di(ω-aminoalkyl-1')-pyrazine of the formula I, and, per 100 parts by weight of the polyglycidyl compound, contains 3 to 20 parts by weight of the copolymer of ethylene, acrylic acid and acrylate, and is in the form of a fine heterogeneous powder, optionally compacted to tablets or granules, such that one category of particles contains the respective polyglycidyl compound and another category of particles contains the 2,5-di-(ω-aminoalkyl-1')-pyrazine of the formula I, and the particles of a third category consist of the copolymer of ethylene, acrylic acid and acrylate.

Surprisingly, it was possible to solve the task of the invention by means of the above composition. On curing at 90° C. (10 to 12 minutes), it was possible to increase the peel strength of corresponding bonds to 5 to 7 N/mm as against 4 N/mm in the system of U.S. Pat. No. 3,860,541.

The epoxy resin adhesives of the present invention contain as polyglycidyl compound (a) preferably solid bisphenol A epoxy resins or glycidylated phenol or cresol novolaks. In principle, mixtures of such solid and liquid glycidyl compounds can also be used, in so far as these mixtures have a softening temperature between 40° and 90° C.

The 2,5-di-(ω-aminoalkyl-1')-pyrazines of the formula I contained in the adhesive of this invention and which act as hardeners are novel compounds. They can be prepared in simple manner by the catalytic hydrogenation of nitro compounds of the general formula II

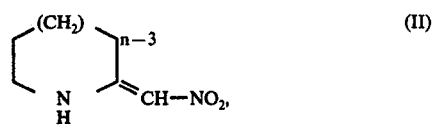

wherein n is an integer from 3 to 6. During the hydrogenation, it is evident that a rearrangement with disintegration of the heterocyclic ring system and simultaneous formation of the pyrazine ring surprisingly takes place in accordance with the following chemical formula:

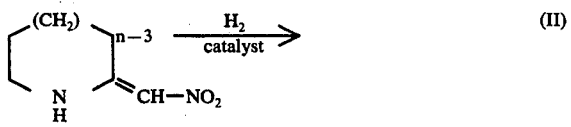

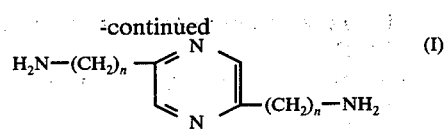

(I)

More exactly, the procedure followed in the preparation of these novel pyrazine derivatives of the formula I is such that 1. a nitro compound of the formula II is catalytically hydrogenated in the presence of an organic acid, optionally in the presence of an additional organic solvent,
2. the catalyst is then filtered off from the resulting mixture, and
3. the pure end product, optionally after a temporary conversion into a salt of a mineral acid, is isolated from the filtrate.

A particularly suitable hardener for the adhesive of the present invention is the 2,5-di-(ω-aminoalkyl-1')-pyrazine of the formula I, wherein n is 5, namely 2,5-di-(5-aminopentyl-1')-pyrazine. This diamine can be readily prepared in good yield by the hydrogenation of 2-nitromethane perhydroazepine.

A suitable hardener for the adhesive of the present invention is also the 2,5-di-(ω-aminoalkyl-1')-pyrazine of the formula I, wherein n is 3, namely 2,5-di-(3-aminopropyl-1')-pyrazine. This diamine is obtained by hydrogenation of α-(2-azolidinylidene)-nitromethane.

Preferably an aliphatic monocarboxylic acid having a total of 2 to 5 carbon atoms, especially acetic acid, is used as organic acid in the preparation of the 2,5-di-(ω-aminoalkyl-1')-pyrazines. Particularly suitable additional solvents are aliphatic alcohols, for example methanol and isopropanol. Further suitable solvents are cyclic ethers, such as dioxane and tetrahydrofurane and aromatic solvents. Corresponding solvent mixtures can also be used.

The hydrogenation is preferably carried out at temperatures between 20° and 150° C. and under slight excess pressure, preferably up to 10 atmospheres. Nickel, cobalt or noble metal catalysts, such as platinum, palladium, rhodium or ruthenium, are used as hydrogenation catalysts.

The hydrogenation solution is worked up by methods commonly known in the art and the product of the formula I is isolated either as a salt or free amine. To prepare the mineral salts of the formula I, the reaction solution is concentrated with the addition of a mineral acid, or the mineral acid is added after the bulk of the organic acid used as solvent has been removed. The pure salts are then obtained by recrystallization. The pure free amine can then be obtained from the aqueous solution of its purified salt by addition of a sufficient amount of NaOH or KOH and isolated by extraction with organic solvents. However, the hydrogenation solution can also be worked up direct with NaOH or KOH to give the crude amine while avoiding the step of isolating the amine salt. A further purification by distillation is also possible.

The nitro compounds of the formula II, which are the starting materials for obtaining the diamines contained in the adhesive of the invention, can be prepared by a known method of R. G. Glushkov and O. Yu. Magidson, which is described in the journal, Zhur. Obshchei Khim. 30, 1855–60 (1960), and in GA 55, 74301. In the case of 2,5-di-(5-aminopentyl-1')-pyrazine, ε-caprolactam is used for example as starting material. The corresponding lactim methyl ether is prepared initially with dimethyl sulphate and the desired 2-nitromethene-perhydroazepine is obtained from this ether by treatment with nitromethane.

By analogy, pyrrolidone-(2) is used as starting material for obtaining 2,5-di-(3-aminopropyl-1')-pyrazine and the above reaction method yields the corresponding α-(2-azolidinylidene)-nitromethane.

Those additives which contain as copolymer (c) 87 to 91% by weight of ethylene, 3 to 5% by weight of acrylic acid and 6 to 8% by weight of acrylate, constitute a preferred embodiment of the adhesives of the present invention.

Observed with the naked eye, the adhesives of the present invention are substantially homogeneous powders. However, in reality, they are multiphase powders with a colloidal to low disperse distribution. In general, the powders have only three categories of particles. One category contains the respective epoxy resin and optionally further non-reacting mixture ingredients. The second category contains the 2,5-di-(ω-aminoalkyl-1')-pyrazine used as hardener, and optionally further non-reacting mixture ingredients. The particles of the third category consist of the copolymer of ethylene, acrylic acid and acrylate having a melting range of 70° to 110° C.

In principle, the adhesive of the present invention can also be in the form of a heterogeneous powder which contains more than three categories of particles. This means, inter alia, that, in addition to the two categories containing the reacting components and the category consisting of the copolymer, the powder mixture can contain further non-reacting ingredients as special categories of particles.

Non-reacting ingredients are in particular fillers, for example kaolin, chalk, quartz powder, powdered slate, heavy spar, talc, and lithophone.

The preparation of the adhesive powders of the present invention is carried out for example by initially grinding the polyglycidyl compound and the 2,5-di-(ω-aminoalkyl-1')-pyrazine separately and afterwards mixing both fine powders intensively with the ethylene/acrylic acid/acrylate copolymer and optionally with further powders of non-reacting mixture ingredients until a homogeneous powder is obtained. In a modification of this procedure, it is also possible to mix all non-reacting ingredients, or a portion thereof, into the polyglycidyl compound or into the 2,5-di(ω-aminoalkyl-1')-pyrazine, preferably by fusion, before the preparation of the individual powders. The grinding to prepare the individual powders is then effected subsequently, and finally these powders are mixed together to give the adhesive.

In principle, the preparation of all or of individual powders can also be dispensed with, namely when the compact material of the precursors is ground jointly in a mill to a homogeneous powder.

However, the epoxy resin adhesives of the present invention do not necessarily have the original powder form, but can also be converted into granules. The known method of compacting can be used for example for this purpose. Very uniform granules are obtained by using tabletting machines.

The principal use of the epoxy resin adhesives of the present invention is in the field of ski construction. Chiefly powder, but also granulated, compositions are used.

In producing bonds with the epoxy resin adhesives of the present invention, it has proved advantageous to use coated fibre webs, woven materials, boards or sheets of plastics, glass or the like as intermediate layer between the surfaces to be bonded. In ski construction, this results for example in an elastic reinforcement of the laminate.

When preparing such fibre webs or the like coated with the adhesives of the invention, the starting substrates are preferably modified with a primer beforehand. Suitable primers are for example thermoplasts, for example polyvinyl formal or polyvinyl butyral or thermoplastic epoxy resins of the phenoxy type. They are applied to the substrate in solution. The epoxy resin is sprinkled in powder form onto the still moist substrate, which is afterwards dried.

Suitable primers are also liquid bisphenol A resins which contain polyamines (for example versamides) as hardeners and which crosslink at room temperature. If such resin systems are highly viscous, they can be used undiluted as primers; otherwise they are used in the form of solutions. In this case too, the powdery epoxy resin composition of the invention is sprinkled onto the still moist substrate treated with the primer. After drying the substrate and curing the primer, excess non-adhering powder is removed.

In many cases, the use of a primer can also be dispersed with and the powder is then pressed onto the substrate cold.

The fibre webs and the like coated with the adhesive also constitute an object of the invention.

In principle, the epoxy resin adhesives can also be used as moulding compounds or for powder coating and for the whirl sinter process.

EXAMPLES

(A) Preparation of the hardeners

EXAMPLE A 80 g of 2-nitromethene-perhydroazepine are dissolved in 800 ml of methanol and 80 ml of glacial acetic acid and the solution is hydrogenated at 45° C. under normal pressure in a hydrogenation flask in the presence of 16 g of 10% palladium on charcoal. The uptake of hydrogen ceases after 3 to 4 hours. The catalyst is filtered off and, after addition of 2 equivalents of alcoholic hydrochloric acid, the filtrate is concentrated in vacuo. The residue is diluted with benzene and concentrated to dryness in vacuo. The solid residue is recrystallized once from 100 ml of isopropanol and then from a mixture of methanol and isopropanol, affording 55.5 g (67% of theory) of 2,5-di-(5-aminopentyl-1')-pyrazine dihydrochloride with a melting point of 305° C. The titration of the salt with NaOH confirms the presence of the dihydrochloride.

For conversion into the free base, 150 g of the dihydrochloride are dissolved in 600 ml of 5N sodium hydroxide solution. After extraction with chloroform, the extract is dried over anhydrous potassium carbonate and concentrated by rotary evaporation in vacuo at 50° C., affording 121.3 g of crystalline amine. Distillation yields 101 g of pure 2,5-di-(5-aminopentyl-1')-pyrazine with a boiling point of 150° C. at 0.02 torr and a melting point of 58°–61° C.

EXAMPLE B 312 g (2 moles) of crude 2-nitromethene-perhydroazepine are dissolved in 680 g of isopropyl alcohol. After addition of 10 g of 5% palladium on charcoal, the mixture is suspended in 132 g of glacial acetic acid and the suspension is hydrogenated at 90° C. under a hydrogen pressure of 8 bar. The theoretical amount of hydrogen (112 liters) is taken up after 2 hours. After cooling to room temperature, the catalyst is filtered off and washed with 150 g of isopropyl alcohol. Then 88 g of pulverized sodium hydroxide are added to the greenish yellow solution and the batch is kept at reflux (78° C.) for 16 hours. Precipitated sodium acetate is filtered off at room temperature and the residue is washed with 250 g of isopropyl alcohol. The solvent is removed at 14 torr/85° C. and the cloudy, greenish brown oil is distilled at 0.1 torr over a bridge-shaped stillhead.

The 2,5-di-(5-aminopenyl-1')-pyrazine distills over at 167°–176° C. The yield is 141.5 g (56.6% of theory). The product has a melting point of 55° to 58° C.

(B) Epoxy resin adhesive

EXAMPLE 1

72 g of a solid epoxy resin based on epichlorohydrin and bisphenol A and having an epoxide-equivalent of 1043 and 7 g of a liquid bisphenol A epoxy resin having an epoxide equivalent of 190 are fused together at 130° C. and the melt is mixed with 21 g of heavy spar, cooled, and ground to a powder having a granular size between 100 and 300μ.

This resin powder (100 g) is mixed for 5 minutes at room temperature with 6.2 g of 2,5-di-(5-aminopenyl-1')-pyrazine, which also has a particle size of 100 to 300μ, and with 0.5 g of "Aerosil" (Degussa) and 5 g of a copolymer powder of ethylene, acrylic acid and acrylate ("LUPOLEN A 2910", BASF). A single component adhesive powder having the following properties is obtained:
  softening point (Kofler bench): 50° to 60° C.
  shelf life at 20°–25° C.: 6 months
  curing time at 90° C.: 10 to 12 minutes
  curing time at 100° C.: 8 to 10 minutes
  tensile shear strength (DIN 53283): 15 to 17 N/mm$^2$
  peel strength (British Standard DTD 5577): 5 to 7 n/mm

EXAMPLE 2

83 g of a solid epoxy cresol novolak having an epoxide equivalent of 230 are fused at 130° C. and the melt is mixed with 17 g of heavy spar, cooled and ground to a powder having a particle size between 100 and 300μ. This resin powder (100 g) is mixed intensively for 5 minutes with 22.6 g of 2,5-di-(5-aminopentyl-1')-pyrazine, which also has a particle size of 100–300μ, and with 0.5 g of "Aerosil" (Degussa) and 5 g of a copolymer powder of ethylene, acrylic acid and acrylate ("Lupolen powder A 2910", BASF) having a particle size of less than 300μ. A single component adhesive powder having the following properties is obtained:
  softening point (Kofler bench): 60° to 64° C.
  shelf life at 20° to 25° C.: longer than 6 months
  curing time at 90° C.: 8 to 10 minutes
  curing time at 100° C.: 10 to 12 minutes
  tensile shear strength (DIN 53 283): 10 to 12 N/mm$^2$
  peel strength (British Standard DTD 5577): 3 to 4 N/mm

What is claimed is:
1. A storable, rapidly hardening epoxy resin adhesive which comprises
  a. a polyglycidyl compound containing an average more than one glycidyl group in the molecule and having a softening temperature between 40° and 90° C., b. a 2,5-di-(ω-aminoalkyl-1')-pyrazine of the general formula I

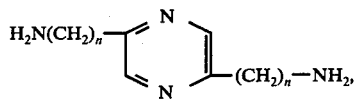 (I)

wherein $n$ is an integer from 3 to 6, and c. a copolymer of ethylene, acrylic acid and acrylate having a melting range from 70° to 110° C., said epoxy resin adhesive comprises, per 1 equivalent of glycidyl groups, 0.5 to 1.5 equivalents of hydrogen atoms bonded to nitrogen of the 2,5-di(ω-aminoalkyl-1')-pyrazine of the formula I, and, per 100 parts by weight of the polyglycidyl compound, 3 to 20 parts by weight of the copolymer of ethylene, acrylic acid and acrylate, and is in the form of a fine heterogeneous powder.

2. An adhesive according to claim 1 wherein the polyglycidyl compound (a) is a bisphenol A epoxy resin.

3. An adhesive according to claim 1 wherein the polyglycidyl compound (a) is a glycidylated phenol or cresol novolak.

4. An adhesive according to claim 1 which comprises 2,5-di-(5-aminopentyl-1')-pyrazine as compound of the formula I.

5. An adhesive according to claim 1 which comprises 2,5-di-(3-aminopropyl-1')-pyrazine as compound of the formula I.

6. An adhesive according to claim 1 wherein the copolymer (c) comprises 87 to 91% by weight of ethylene, 3 to 5% by weight of acrylic acid and 6 to 8% by weight of acrylate.

* * * * *